UNITED STATES PATENT OFFICE.

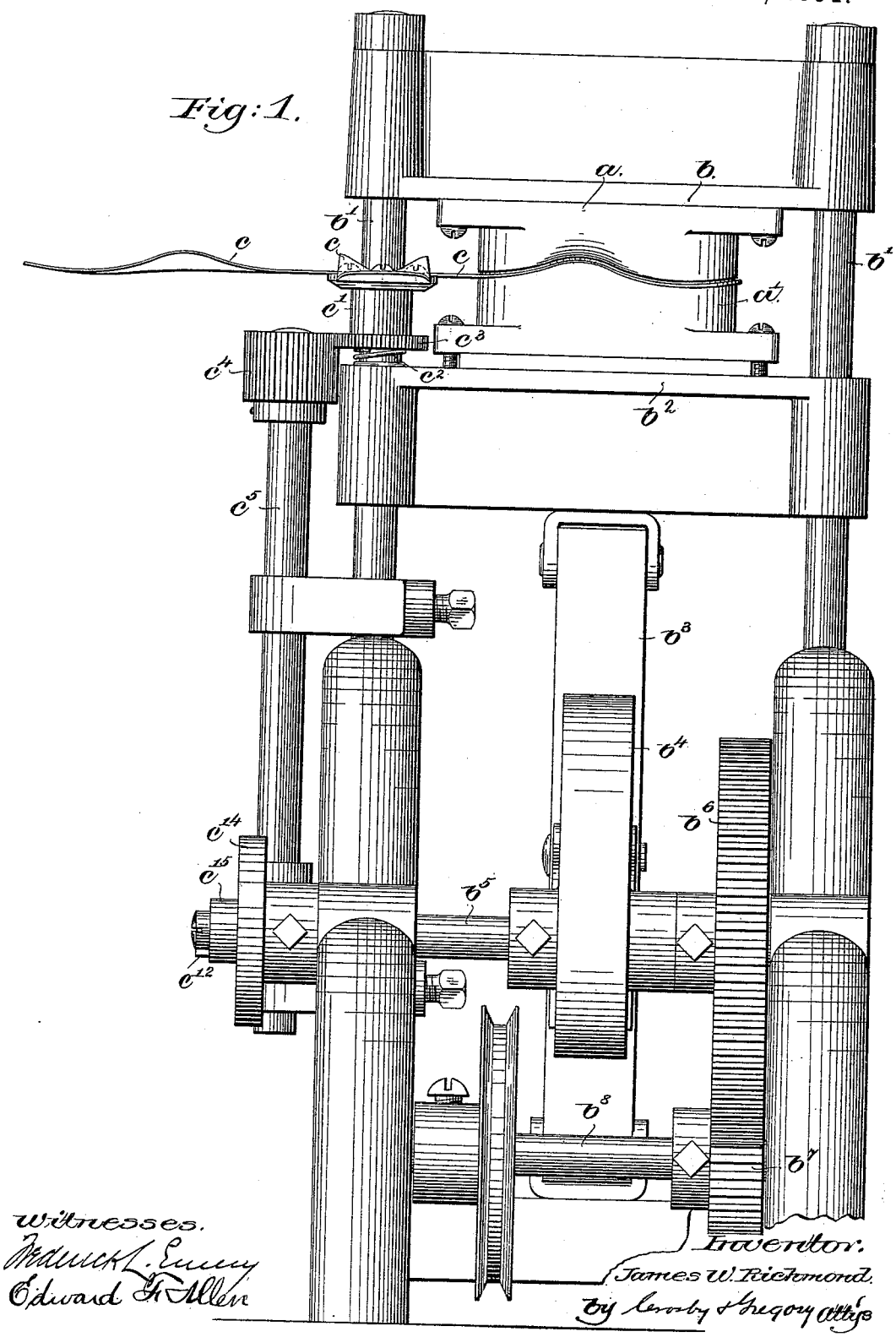

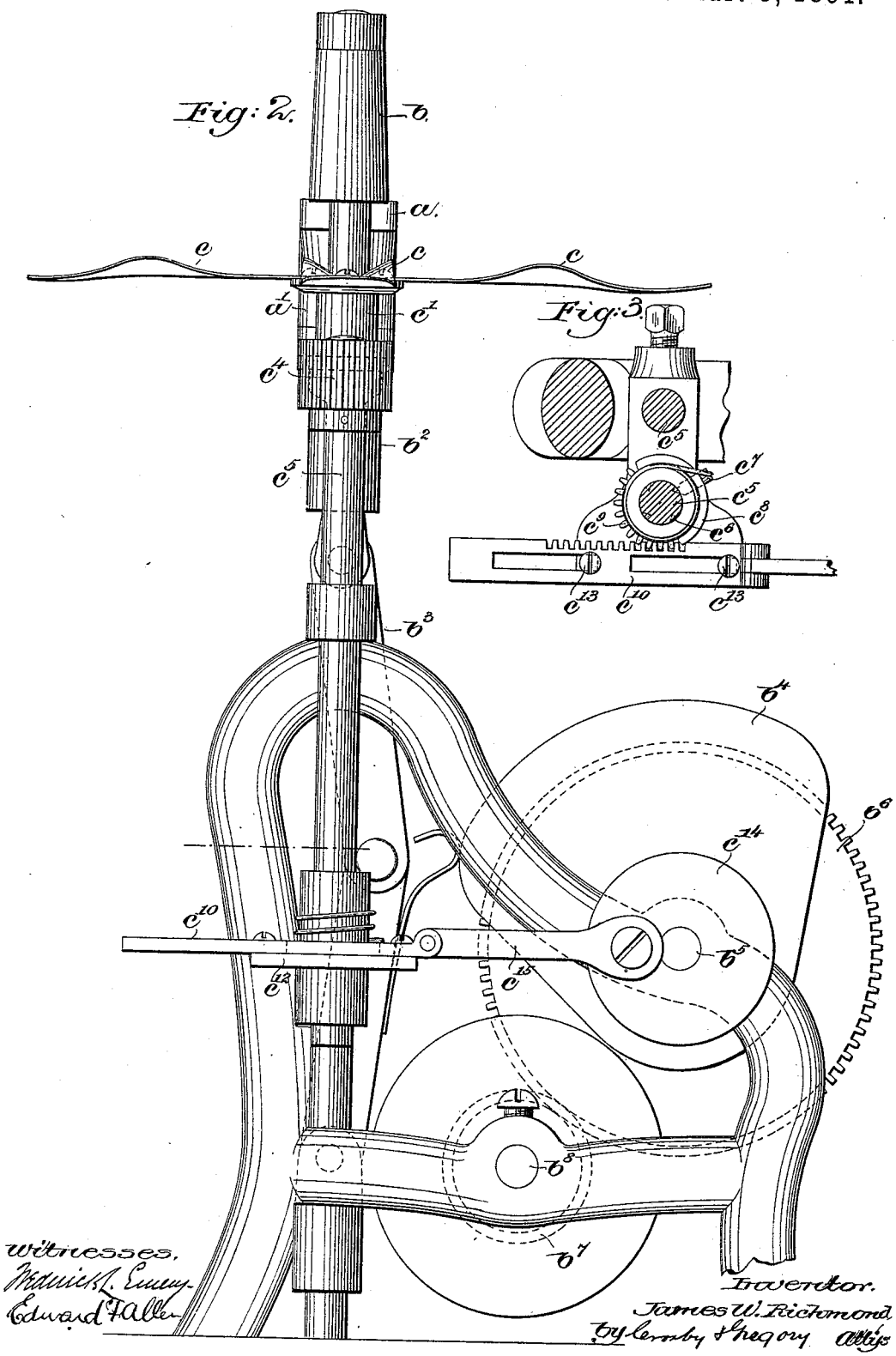

JAMES W. RICHMOND, OF SOUTH HANOVER, MASSACHUSETTS, ASSIGNOR OF ONE-HALF TO EDWARD M. SWEENY, OF SAME PLACE.

SOLE-MOLDING MACHINE.

SPECIFICATION forming part of Letters Patent No. 447,739, dated March 3, 1891.

Application filed October 27, 1890. Serial No. 369,396. (No model.)

*To all whom it may concern:*

Be it known that I, JAMES W. RICHMOND, of South Hanover, county of Plymouth, State of Massachusetts, have invented an Improvement in Sole-Molding Machines, of which the following description, in connection with the accompanying drawings, is a specification, like letters on the drawings representing like parts.

Sole-molding machines as now commonly constructed consist of two dies, one of which is movable with relation to the other, and suitable mechanism for moving the said movable die.

In operating such a machine the attendant places the sole to be molded on the lower die by hand, and after it has been molded removes it by hand and places thereon another. The operator soon becomes tired and careless, and the result is that his hand becomes caught between the dies and is crushed.

This invention has for its object to improve the construction of this style of machine with a view to overcoming this dangerous feature, and also to improve that class of machines wherein a series of sole carriers or holders are arranged in a horizontal plane between the dies and provided with mechanism for moving the carriers intermittingly.

In accordance with this invention a series of sole carriers or holders are arranged to be moved in a horizontal plane, and suitable means are provided for moving them intermittingly. The movable die of the sole-molding machine normally lies just below the plane of rotation of these sole-carriers, so that said carriers may be moved successively over the said movable die, and said sole-carriers are arranged to be moved vertically by the movable die or otherwise to press the sole laid thereon into contact with the stationary die, thereby molding the sole when supported on its carrier. The soles to be molded are laid upon the carriers, and by them are presented to the dies, thereby obviating the necessity of placing the sole in proper position on one of the dies by hand and thereafter removing it.

Figure 1 shows a rear side view of a sole-molding machine embodying this invention; Fig. 2, a side elevation of the machine shown in Fig. 1, and Fig. 3 a detail to be referred to.

The stationary die $a$ is mounted on a bed-plate $b$, supported by the vertical standards $b'$ $b'$. The movable die $a'$ is mounted on a bed-plate $b^2$, which is adapted to move vertically on the said standards $b'$ $b'$. The bed-plate $b^2$ is connected to a toggle-lever $b^3$, which is acted upon by a cam $b^4$ to raise and lower the die $a'$. The cam $b^4$ is secured to a shaft $b^5$, which is driven by a toothed wheel $b^6$, engaged by a pinion $b^7$, secured to a shaft $b^8$, carrying a suitable drive-wheel. As the shaft $b^5$ is revolved and makes a complete turn the die $a'$ will be raised and lowered.

The machine thus far described is of any ordinary or usual construction, but may be of any other equivalent construction.

A series of carriers (four being herein shown as $c$ and made sole-shaped) are secured to a hub $c'$, mounted loosely on one of the standards $b'$ and supported on a spring $c^2$, by means of which it is allowed to yield more or less. A toothed wheel $c^3$ is secured to or formed on the hub $c'$, which is engaged by a pinion $c^4$, secured to a vertical shaft $c^5$, having its bearings in the frame-work, said shaft $c^5$ having at its lower end a series of notches to form ratchet-teeth $c^6$, (see dotted lines, Fig. 3,) one or another of which is engaged by a pawl $c^7$, carried by a rotatable pawl-carrier $c^8$, which is arranged loosely on the shaft $c^5$ at its lower end, and which has formed on it a series of teeth $c^9$, which are engaged by a toothed rack $c^{10}$, mounted on a plate $c^{12}$ on the frame-work and guided in its horizontal movement by suitable guide-pins $c^{13}$. This rack is connected to the crank $c^{14}$ by a crank-arm $c^{15}$. This crank $c^{14}$ is secured to the shaft $b^5$, so that at each revolution of the said shaft the rack $c^{10}$ will make one complete movement back and forth. As the rack $c^{10}$ reciprocates, the pawl-carrier is likewise reciprocated, and by means of the pawl $c^7$ the shaft $c^5$ is moved forward intermittingly a quarter of a revolution, and there being four sole-carriers $c$ carried by the hub $c'$, which is driven by the pinion $c^4$, one or another sole-carrier will be interposed between the dies at each reciprocation of the rack.

The sole-carriers $c$ are movable in a horizontal plane as the hub to which they are attached is reciprocated, and the pinion $c^4$ is made long enough to permit the hub $c'$ to be moved vertically and yet enable its toothed wheel $c^3$ to keep its engagement therewith.

The die $a'$ lies just beneath the plane of rotation of the sole-carriers, so that one of the said carriers with a sole thereon will occupy a position just above this movable die $a'$, and as the die $a'$ is lifted by the mechanism heretofore described the carrier having the sole thereon will be moved with it up against the stationary die $a$. After the sole has been molded the sole-carriers return to their normal position by gravity as the die $a'$ returns to its normal position, and immediately thereafter the hub $c'$ will be given a quarter-turn and the next carrier of the series will be moved in position between the dies and the previous operation is repeated. By means of these sole-carriers the necessity of placing the sole on one of the dies by hand to be molded and thereafter removing them is obviated.

I do not desire to limit my invention to the number of sole-carriers.

I claim—

1. In a sole-molding machine, two dies and means for moving one with relation to the other, combined with a sole-carrier, a rotatable and vertically-movable hub to which it is attached, a toothed wheel on said hub, a pinion in engagement therewith on a shaft having at its lower end a series of notches to form ratchet-teeth, a pawl-carrier rotatable on said shaft and having a series of teeth thereon, and a reciprocating toothed rack engaging said pawl-carrier to thereby rotate the shaft and sole-carrier, substantially as described.

2. In a sole-molding machine, two dies and means for moving one with relation to the other, a series of sole-carriers located in a horizontal plane between the dies and adjacent to the face of the movable die, and a rotatable hub supporting said carriers, and mechanism to rotate and vertically move the hub and carriers, the movable die carrying the sole-carriers up to and against the fixed die to mold the sole, substantially as described.

3. In a sole-molding machine, two dies and means for moving one with relation to the other, combined with a series of sole-carriers, a rotatable and vertically-movable hub to which they are attached, and a spring supporting said hub, and means for moving the hub and carriers, substantially as described.

In testimony whereof I have signed my name to this specification in the presence of two subscribing witnesses.

JAMES W. RICHMOND.

Witnesses:
CHARLES F. WILSON,
HENRY L. SWEENY.